(12) United States Patent
Buck

(10) Patent No.: US 12,448,748 B2
(45) Date of Patent: Oct. 21, 2025

(54) NIGHT-VISIBLE DOCK PILING CAPS

(71) Applicant: Douglas J. Buck, Palm Beach, FL (US)

(72) Inventor: Douglas J. Buck, Palm Beach, FL (US)

( * ) Notice: Subject to any disclaimer, the term of this patent is extended or adjusted under 35 U.S.C. 154(b) by 0 days.

(21) Appl. No.: 17/956,441

(22) Filed: Sep. 29, 2022

(65) Prior Publication Data

US 2024/0110353 A1    Apr. 4, 2024

(51) Int. Cl.
| | | |
|---|---|---|
| *E02B 3/20* | (2006.01) | |
| *F21S 11/00* | (2006.01) | |
| *F21S 13/02* | (2006.01) | |
| *F21W 111/04* | (2006.01) | |
| *F21Y 101/00* | (2016.01) | |

(52) U.S. Cl.
CPC ............... *E02B 3/20* (2013.01); *F21S 11/002* (2013.01); *F21S 13/02* (2013.01); *F21W 2111/04* (2013.01); *F21Y 2101/00* (2013.01)

(58) Field of Classification Search
CPC .... E02B 3/20; E02B 3/068; E02B 3/24; F21S 11/002; F21S 13/02; F21W 2111/04; F21Y 2101/00; F21V 33/006; F21K 2/06
See application file for complete search history.

(56) References Cited

U.S. PATENT DOCUMENTS

| | | | | |
|---|---|---|---|---|
| 19,332 | A * | 2/1858 | Ammen | F21V 5/00 362/337 |
| 4,161,090 | A * | 7/1979 | Watts, Jr. | E04H 17/06 D25/135 |
| 5,419,536 | A * | 5/1995 | Bender | E04H 17/006 52/301 |
| 6,375,864 | B1 * | 4/2002 | Phillips | C08K 3/02 524/439 |
| 8,672,505 | B1 * | 3/2014 | Hogan | F21S 9/037 362/183 |
| 9,187,034 | B2 * | 11/2015 | Tarahomi | C09K 11/025 |

(Continued)

FOREIGN PATENT DOCUMENTS

WO    WO-2017139458 A1 *    8/2017    ............. A42B 1/048

OTHER PUBLICATIONS

"Plastic Products for Marine Applications", https://www.polymershapes.com/application/marine/#:~:text=Common%20plastics%20used%20in%20the%20marine%20industry%20include%3A, Butadiene%20Styrene%20%28ABS%29%208%20Diab%20Divinycell%20coring%20composites; (Year: 2023).*

*Primary Examiner* — Jong-Suk (James) Lee
*Assistant Examiner* — Glenn D. Zimmerman
(74) *Attorney, Agent, or Firm* — Boswell IP Law; J. Mason Boswell

(57) ABSTRACT

A glow-in-the-dark piling cap is described herein that uses glow-in-the-dark materials on a dock piling cap to make pilings to which the cap is installed visible at night without the maintenance hassles of electrical-based lighting. The cap provides typical protection for the piling from the elements as well as lighting to aid boaters and users of the structure associated with the piling to see the piling at night. The glow-in-the-dark substance can be coated on the piling cap or mixed into the plastic, resin, or other material used to make the cap. The use of glow-in-the-dark materials eliminates any need for maintenance. Thus, the glow-in-the-dark piling cap provides protection for the piling, and maintenance-free lighting to alert boaters and users of the structure associated with the piling to nighttime hazards.

20 Claims, 6 Drawing Sheets

(56) References Cited

U.S. PATENT DOCUMENTS

| | | | |
|---|---|---|---|
| 10,424,173 B1 | 9/2019 | Bien | |
| 10,989,379 B2 | 4/2021 | Bien | |
| 11,384,911 B1 * | 7/2022 | Bien | H02S 40/38 |
| 2006/0130727 A1 * | 6/2006 | Eischeid | E01F 9/617 |
| | | | 114/219 |
| 2010/0291409 A1 * | 11/2010 | Dicks | C09D 11/50 |
| | | | 252/301.36 |
| 2012/0286675 A1 * | 11/2012 | Carmen | G08C 17/02 |
| | | | 362/85 |
| 2019/0000205 A1 * | 1/2019 | Carden | A45C 15/06 |
| 2019/0203438 A1 * | 7/2019 | Herdman | E04H 17/006 |
| 2020/0018455 A1 * | 1/2020 | Bien | E02D 5/22 |
| 2021/0186136 A1 * | 6/2021 | Romano | A42B 1/048 |

* cited by examiner

NIGHT-VISIBLE DOCK PILING CAPS

BACKGROUND

Marine navigation is the process of controlling the movement of a boat through a waterway. Nighttime marine navigation can be far more difficult than daytime marine navigation. At night, visibility is greatly reduced and obstacles that would be clearly visible in the day can be difficult to see. Unlike cars, boats do not typically have headlights and even when they do, their use is not recommended at night due to reflections lights produce on the water, waves, and mist that can be blinding for the vessel using them. Although non-visual tools exist for navigation, such as global positioning systems (GPS) and radar, there is still great comfort in being able to see what is ahead of a vessel.

One type of obstacle a marine vessel may encounter is a piling, such as those on docks and other structures placed in the water. A piling, unlike a buoy which floats, is typically embedded in the ground below the water, and is not moveable. Hitting such a piling can be disastrous for a boat and its occupants. Although moving vessels and navigational buoys often have jurisdictional lighting requirements, docks and other structures often do not. A dock owner may choose to light their dock for their own convenience of docking or using the dock, but this is not guaranteed, making such structures very difficult to detect at night.

Current methods of lighting a dock have multiple disadvantages. Electrical lighting of a dock requires power to be available at the dock, with its own hazards (potential shock) and maintenance requirements. Electricity may be difficult to obtain or completely unavailable at every location a dock may be desired. Battery powered lighting solutions require that someone maintain the batteries, potentially regularly taking them somewhere else to charge if electricity is not available at the location. Batteries also may deteriorate over time, only increasing the maintenance burden as more frequent charging is required. Solar lighting solutions are often not very bright and rely on sufficient daytime sun exposure to recharge. They are also often coupled with a battery for power storage that may deteriorate over time. Reflectors depend on light coming from a vessel to be reflected back at the vessel. Because boats often have only low-level lighting to prevent reflections upon the water, they lack sufficient light to make a reflector effective.

DETAILED DESCRIPTION

Figure 1:
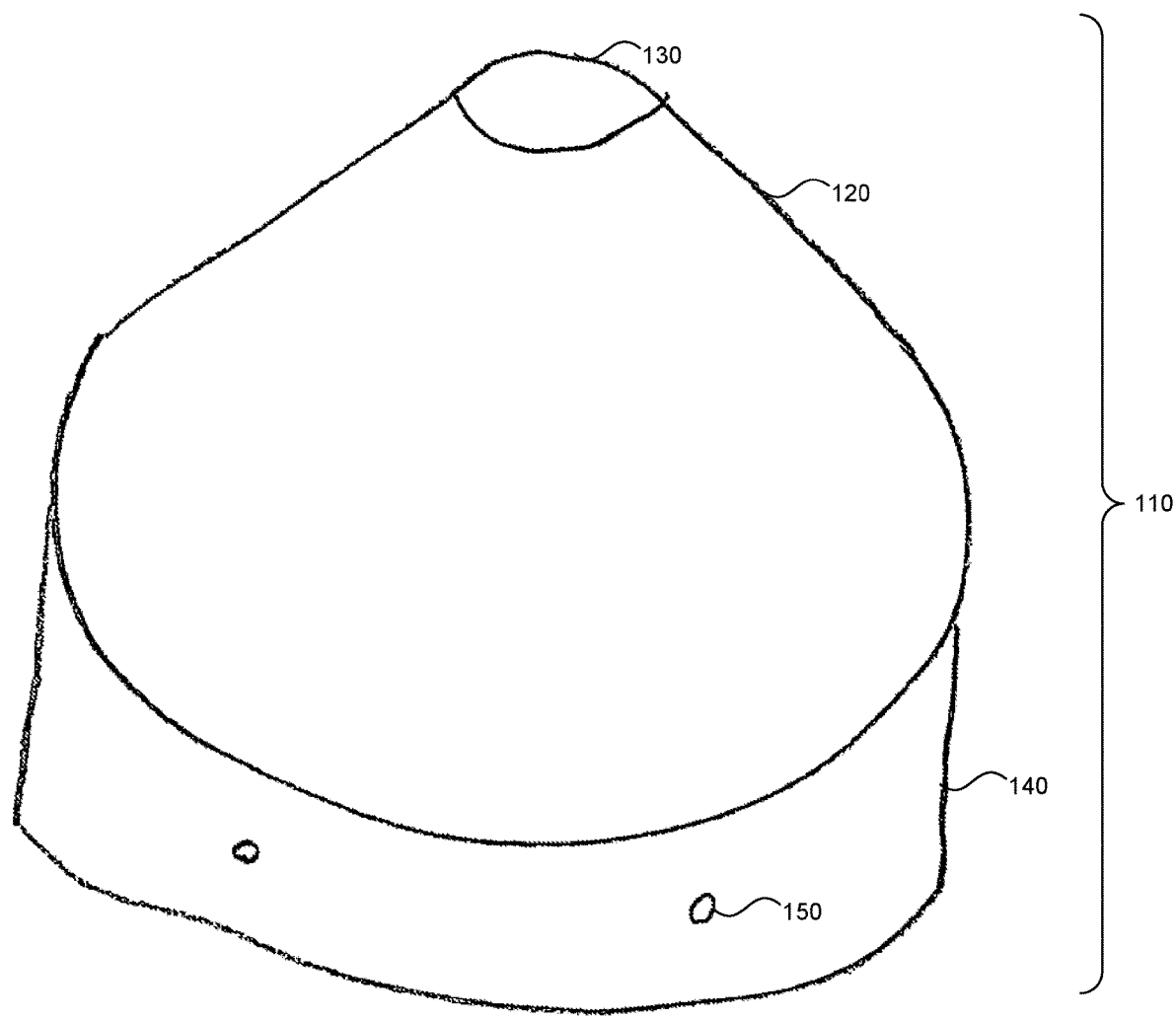
FIG. 1 is a perspective view of one embodiment of the glow-in-the-dark dock piling cap designed for a round dock piling.

A glow-in-the-dark piling cap is described herein that uses glow-in-the-dark materials on a dock piling cap to make pilings to which the cap is installed visible at night without the maintenance hassles of electrical-based lighting. The cap provides typical protection for the piling from the elements as well as lighting to aid boaters and users of the structure associated with the piling to see the piling at night. The lighting alerts boaters to the presence of a structure in the water that might not otherwise be visible or might be difficult to see at night. The cap can be made of durable materials that withstand freshwater, saltwater, ultraviolet (UV) rays from the sun, and other harsh elements. The cap can be shaped in a manner that sheds water off of the top of the cap and prevents birds from sitting on top of the piling. For example, the cap may be made in a conical shape at the top that comes to a point or blunt surface to deter water, birds, or other items from settling on top of the cap. The glow-in-the-dark substance can be coated on the piling cap or mixed into the plastic, resin, or other material used to make the cap. The caps may include a circular section at the base of the cap that is sized to fit over a dock piling and allows a surface through which fasteners (e.g., screws) can be drilled through the cap and piling to attach the two together and prevent the cap from being blown off or removed easily. The use of glow-in-the-dark materials eliminates any need for maintenance of electrical items such as batteries and light bulbs and eliminates the need to have electricity present at the dock. The glow-in-the-dark material also takes in light all day and discharges the light at the right time each night, without any human interaction to turn it on or off. The material also eliminates the introduction of potentially hazardous elements, such as lithium-based batteries, to the marine environment. Thus, the glow-in-the-dark piling cap provides protection for the piling, and maintenance-free lighting to alert boaters and users of the structure associated with the piling to nighttime hazards.

Glow-in-the-dark coatings typically use phosphorus (or phosphorus-like chemicals), an element that can absorb and store surrounding light when exposed to light and release the stored light as a visible glow in dark conditions. Phosphorus is a natural mineral found in the human body and is non-toxic and readily available. Recent advancements in glow-in-the-dark coatings have increased both the intensity and duration of the glow they produce. Research has also identified specific genes in glowing mushrooms that have been applied to other plants (e.g., trees and tobacco plants) to make them glow in the night as a byproduct of their natural metabolism. Glowing proteins found in jellyfish have even been adapted to make a cat that glows in the dark. Even chemicals used in making glow-in-the-dark coatings have improved. While zinc sulfide is less bright and does not last as long, strontium aluminate is much brighter and longer lasting. Strontium aluminate has been used in a paint for the Nissan TM Leaf TM to make the car glow in the dark for up to 8-10 hours after the sun goes down.

The color of the glow in the dark coating may be selected to convey a message about the item to which it is applied. For example, green is used in boating to indicate starboard, and red is used to indicate port positioning. Buoys and other navigational markers often use similar colors to indicate whether boats should stay to the right or left of these markers to be in safe water (e.g., sufficient depth or avoid underwater hazards). Glow in the dark materials come in a variety of colors and the cap described herein can be designed to emit a particular color to indicate how the cap is being used or what direction the hazard is in.

It is common to place conical piling caps on top of dock pilings to protect the end grain of the wood from water and birds, which can both deteriorate the piling more rapidly. Such piling caps are often solid plastic and provide no lighting, just protection from the elements. Because electricity is often not present in water locations and docks become hazardous at night, dock pilings are a great place to place non-electrical lighting to increase their visibility. Dock piling caps can be coated with glow-in-the-dark coatings or molded with glow-in-the-dark materials in their plastic structure, providing a maintenance-free method of lighting the piling at night. This solution requires no electricity, no batteries, and no solar cell to provide light. This solution is also low-cost as it requires no wiring, infrastructure, or other increased safety mechanisms such as are required when electricity is brought over water. The piling cap is simply secured to the dock piling in the normal manner and is lit by the innate characteristics of the glow-in-the-dark substrate applied to the piling cap, without any day/night sensors, solar cells, batteries, or other complex circuitry being needed.

Dock pilings are not always round at the top and can be square, rectangular, or have other end profiles. Dock caps can be made pyramidal and other shapes to easily fit on the end of dock piling and still provide the benefits of shedding water and keeping animals and other potential harms off of the top of the dock piling. Dock pilings may be made of treated lumber, galvanized steel, composites, and other materials. Piling caps can be made to affix to these various materials in various ways, such as with predrilled holes for nails/screws, glue-on applications, weldable applications, and so forth. The cap itself can even be threaded to allow it to screw on to the top of the piling.

The glow-in-the-dark dock piling cap may be made of a thin material, such as plastic, that is sized in thickness to provide an appropriate strength profile so that the cap is strong enough to endure the elements it will normally be subjected to as well as occasional bumps and dings from people and the equipment moved along the dock for boating. The cap may be hollow inside, having inside dimensions that fit over a round or rectangular piling, leaving a hollow portion within the point of the cone or pyramid. The caps can be made in a variety of sizes designed to fit well on common piling sized, such as 7", 8", 9", or other diameters.

FIG. 1 is a perspective view of one embodiment of the glow-in-the-dark dock piling cap designed for a round dock piling. The dock piling cap 110 is made of or coated with a substance that glows in the dark after absorbing light during the daytime. The dock piling cap 110 has an angled portion 120 that is conical in shape and sheds water by gravity and discourages items or animals from sitting on the cap 110. The point 130 of the cap may be blunted to prevent harm from a sharp pointed object. The dock piling cap 110 includes a portion 140 that is parallel to the sides of the dock piling and slightly larger in diameter such that the cap 110 slides over a dock piling. The dock piling cap 110 may include predrilled holes, such as hole 150 for inserting fasteners (e.g., nails or screws) through the cap 110 and into the dock piling to keep the cap 110 in place.

Figure 2:
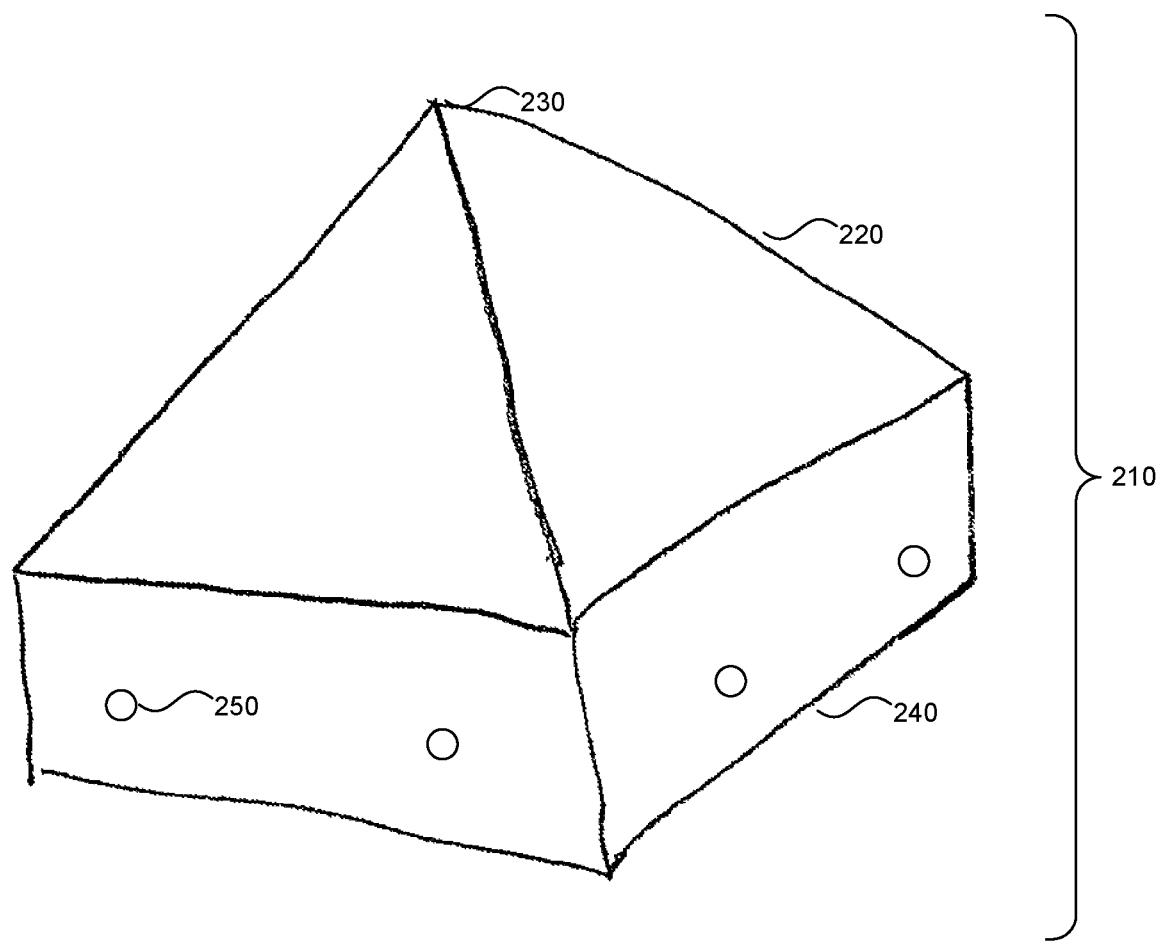
FIG. 2 is a perspective view of one embodiment of the glow-in-the-dark dock piling cap designed for a rectangular dock piling.

FIG. 2 is a perspective view of one embodiment of the glow-in-the-dark dock piling cap designed for a rectangular dock piling. Similar to FIG. 1, the dock piling cap 210 is made of or coated with a substance that glows in the dark after absorbing light during the daytime. The dock piling cap 210 has an angled portion 220 that is shaped like a pyramid and sheds water by gravity and discourages items or animals from sitting on the cap 210. The point 230 of the cap may be blunted to prevent harm from a sharp pointed object. The dock piling cap 210 includes a portion 240 that is parallel to the sides of the dock piling and slightly larger in dimensions such that the cap 210 slides over a dock piling. The dock piling cap 210 may include predrilled holes, such as hole 250 for inserting fasteners (e.g., nails or screws) through the cap 210 and into the dock piling to keep the cap 210 in place.

Figure 3:
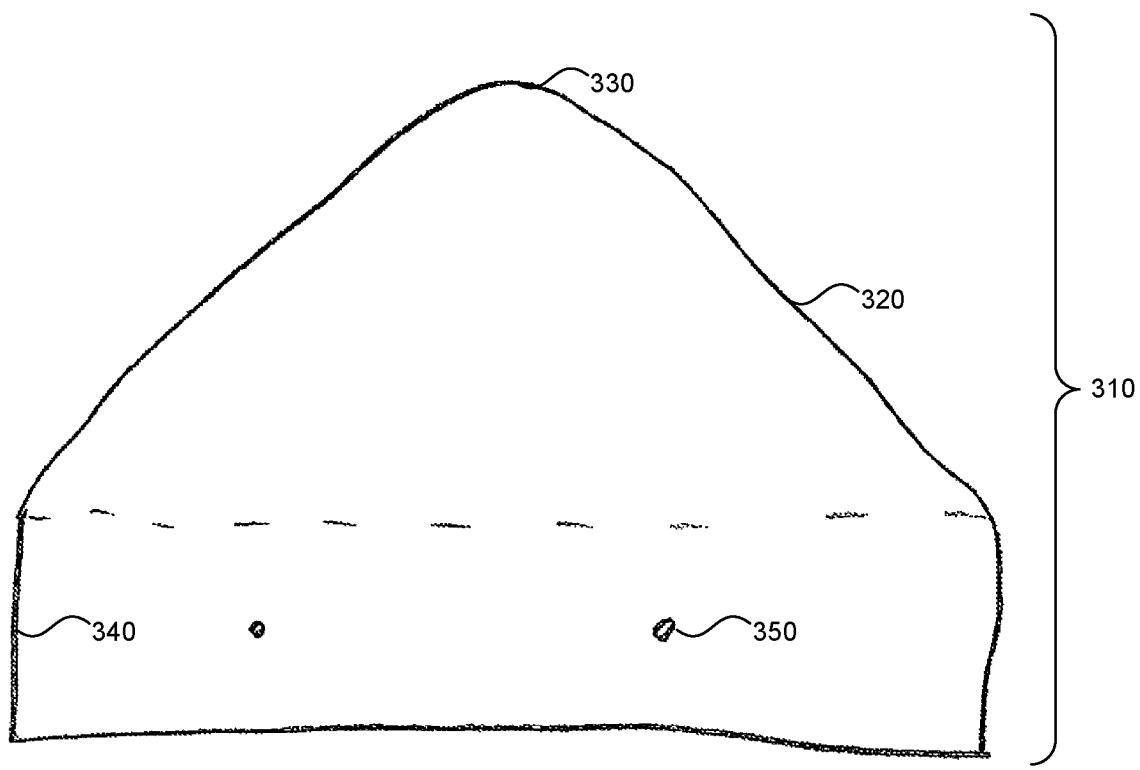
FIG. 3 is a side elevation view of the glow-in-the-dark dock piling cap, in one embodiment.

FIG. 3 is a side elevation view of a glow-in-the-dark dock piling cap, in one embodiment, such as that of FIG. 1. The dock piling cap 310 is made of or coated with a substance that glows in the dark after absorbing light during the daytime. The dock piling cap 310 has an angled portion 320 that is conical in shape and sheds water by gravity and discourages items or animals from sitting on the cap 310. The point 330 of the cap may be blunted to prevent harm from a sharp pointed object. The dock piling cap 310 includes a portion 340 that is parallel to the sides of the dock piling and slightly larger in diameter such that the cap 310 slides over a dock piling. The dock piling cap 310 may include predrilled holes, such as hole 350 for inserting fasteners (e.g., nails or screws) through the cap 310 and into the dock piling to keep the cap 310 in place.

Figure 4:
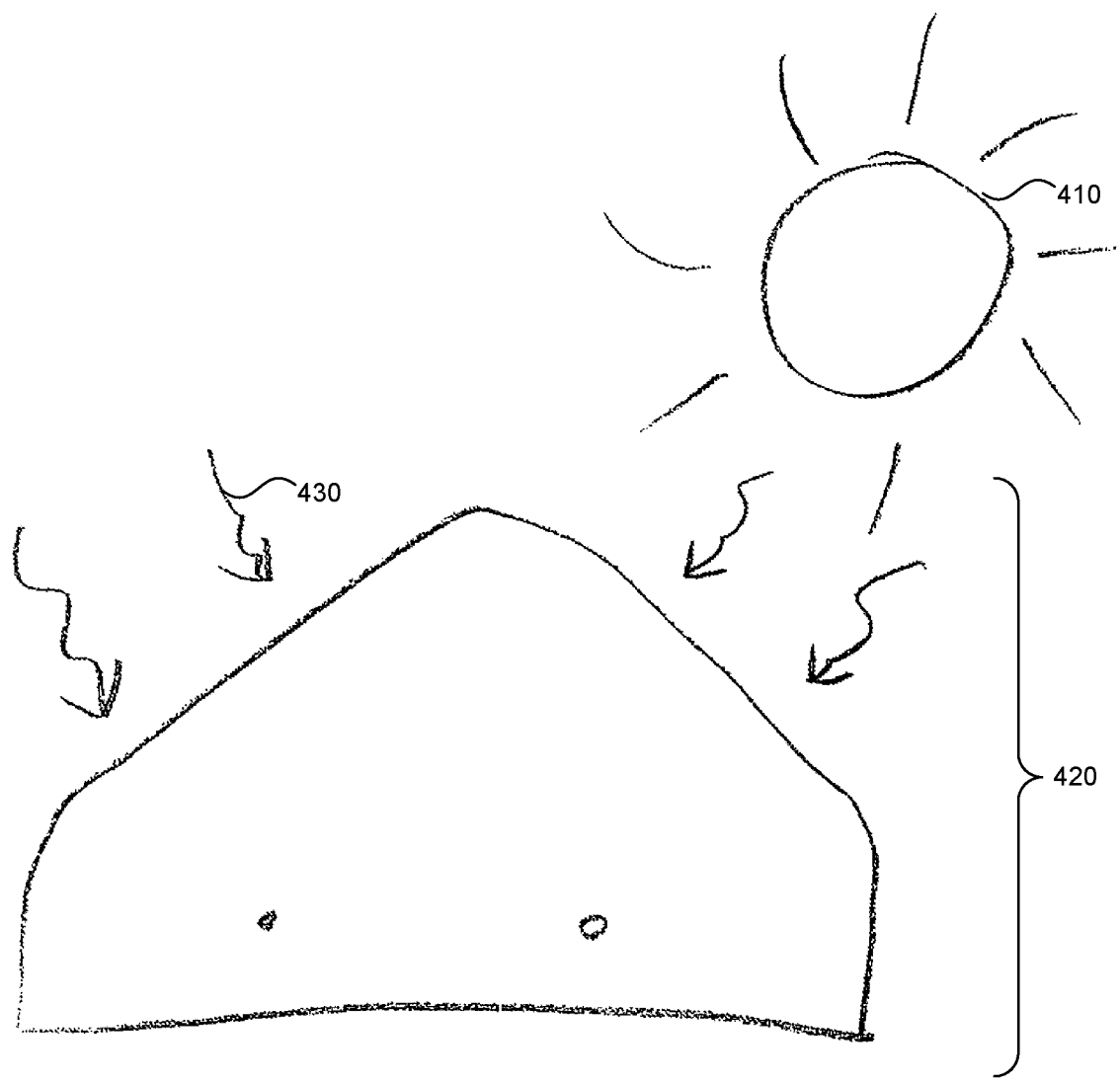
FIG. 4 is a side elevation view of the functional characteristics of the dock piling cap to absorb light, in some embodiments.

FIG. 4 is a side elevation view of the functional characteristics of the dock piling cap to absorb light, in some embodiments. The sun 410 or other ambient light source radiates light 430 into the dock piling cap 420. The dock piling cap 420 is constructed of a material or coated with a coating that absorbs the radiated light 430, such as phosphorus, strontium aluminate, or other substance. During daylight hours, the dock piling cap 420 automatically and without any human interaction or sensors absorbs daylight due to the material properties of the glow-in-the-dark substance.

Figure 5:
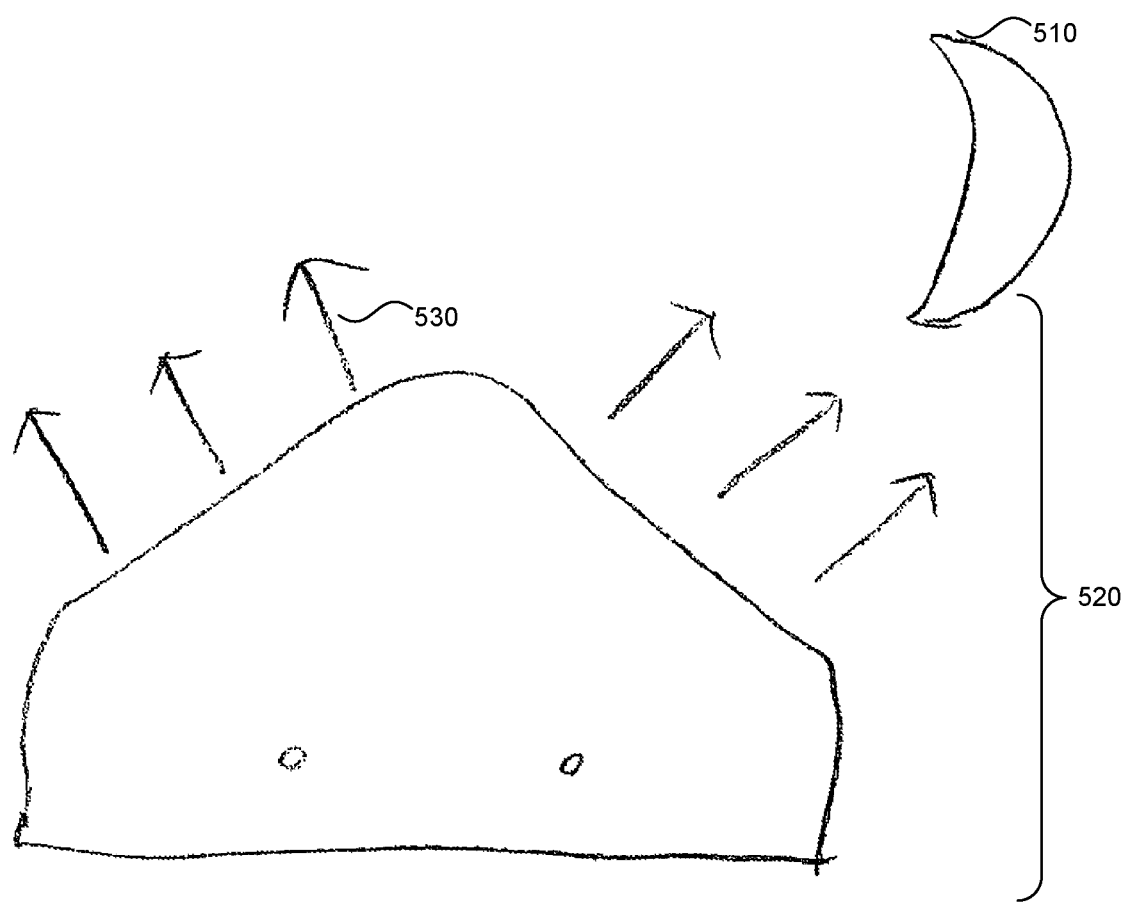
FIG. 5 is a side elevation view of the functional characteristics of the dock piling cap to radiate light, in some embodiments.

FIG. 5 is a side elevation view of the functional characteristics of the dock piling cap to radiate light, in some embodiments. The moon 510 is shown only to indicate that it is nighttime, the sun has gone down, and is not required for the functional aspects of the dock piling cap 520. At night, in low light conditions, the cap 520 radiates light 530. The dock piling cap 520 is constructed of a material or coated with a coating that radiates light 530 absorbed earlier during daylight hours, such as phosphorus, strontium aluminate, or other substance. During low-light hours, the dock piling cap 520 automatically and without any human interaction or sensors radiates light due to the material properties of the glow-in-the-dark substance.

Figure 6:
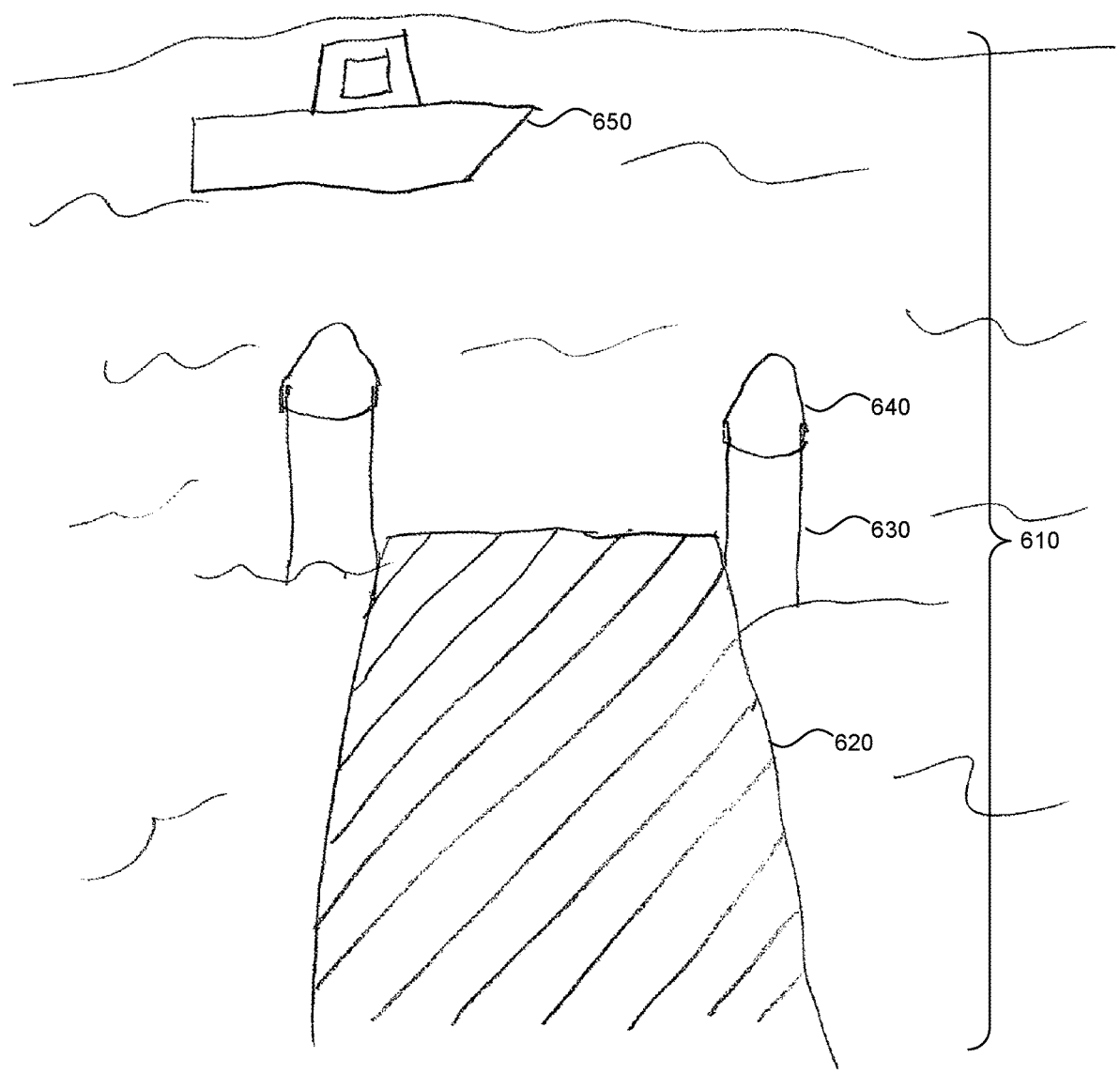
FIG. 6 is a perspective view of a plurality of glow-in-the-dark dock piling caps on a dock with a plurality of dock pilings in a waterway with boat traffic, in one embodiment.

FIG. 6 is a perspective view of a plurality of glow-in-the-dark dock piling caps on a dock with a plurality of dock pilings in a waterway with boat traffic, in one embodiment. A waterway 610, such as a river, ocean, lake, or similar body of water contains a dock 620 that extends out into the waterway 610 and could be struck by a passing boat 650. The dock includes one or more pilings 630 and the dock piling cap 640 is affixed to the top of the dock piling 630. The dock piling cap 640 radiates light at night that is visible to the occupants of the boat 650 as well as users of the dock 620. The light produced by the dock piling cap 640 increases the safety of the waterway 610 and needs no maintenance, human interaction, sensors, or controls to perform its function of providing light at night to alert people to the presence of the dock 620. The light produced by the dock piling cap 640 can be seen for 360 degrees around the dock piling 630, as well as above the dock piling 630 (e.g., for aircraft or taller boats that might be near the piling 630).

The dock piling cap described herein is constructed of marine-grade materials that can last many years in the environment where a dock is normally found. The dock piling cap can be used on docks, decks, or any other obstruction with pilings that can benefit from automatic nighttime illumination. The dock piling cap is automatic in the sense that it will radiate light whenever it is in low-light conditions without anyone "turning it on" or without any sensor or other control's operation being necessary for it to know to come on. The cap radiates light at the right time due to the inherent nature of the substance used to produce a glow-in-the-dark effect. Shapes other than a dock piling cap can be used to attach a similar device to buoys or other potential obstructions.

As shown in the figures, the dock piling cap preferably has an angled top for shedding water and preventing the standing of animals or the placement of objects (e.g., soda cans, oil cans, etc.) that might damage the dock piling. The dock piling cap also has a sidewall parallel to the sides of the dock piling that may be one piece with the top (e.g., constructed integral, monolithically formed, etc.) that provides a mountain flange for attaching the dock piling cap to the dock piling. Adhesives, screws, or other fastening methods can be used.

The bottom opening of the dock piling cap can be sized and/or shaped to provide a tight/secure fit to the top of the piling or other intended structure it is to be secured to. Alternatively, or in addition to the tight fit, one or more fastening holes can be provided through the lower area/side wall of the dock piling cap for insertion of a screw, bolt, etc. for securing the dock piling cap to the piling or other structure. Adhesives applied to the piling/structure and/or inside surface of the side wall can also be used in addition to or as an alternative securement mechanism. Preferably the side wall can be shaped according to the shape of the top of the piling/structure to allow the top of the piling to easily mate with the bottom opening of the dock piling cap. In one non-limiting embodiment, the shape of side wall and the cap bottom opening defined by the side wall can be circular, round, oval, rectangular, etc. in shape though other shapes can be used and are considered within the scope of the disclosure.

The dock piling cap may also include reflective material along the sidewall or angled portion of the cap to allow for increased visibility of the dock piling cap when reflect-able light is available (e.g., when a boat is docking with docking lights at the dock).

The glow-in-the-dark dock piling cap also helps to reduce or prevent swelling of the piling from water intrusion into the end grain of wood pilings. Providing the light with or as part of the piling cap helps nearby marine traffic to identify obstructions in the water during nighttime hours to help reduce or prevent accidents. Lighting the pilings with the disclosed lighted piling caps also increases safety and navigation for boaters during nighttime hours.

The angle for the top portion/slope of the dock piling cap is not considered limited to any particular angle and various angles can be selected and used. The angled portion also need not be straight and rounded top portions can be used. The disclosed dock piling cap can also be used with poles, posts, and other vertically extending objects (collectively referred to as "pilings" herein) found on marine docks, decks, piers, as well as pilings extending up out of the water, and such other uses are also considered within the scope of the disclosure.

The above characteristics are provided by way of example only and are not considered limiting and other characteristics, features, ratings, dimensions, values, etc. can be used and are also considered within the scope of the disclosure.

It should be understood that the exemplary embodiments described herein should be considered in a descriptive sense only and not for purposes of limitation. Where multiple embodiments are disclosed, descriptions of features or aspects within each embodiment should typically be considered as available for other similar features or aspects in other embodiments. While one or more embodiments have been described with reference to the figures, it is understood that various changes in form and details may be made therein without departing from their spirit and scope and such changes are considered within the scope of the disclosure.

All parts/components of the lighted piling cap and their locations, mechanical communications between parts/components, attachment or securement mechanisms, dimensions, values, ratings, shapes, materials, etc. discussed above or shown in the figures, if any, are merely by way of example and are not considered limiting and other component(s) and their locations, mechanical communications between parts/components, attachment or securement mechanisms, dimensions, values, ratings, shapes, materials, etc. can be chosen and used and all are considered within the scope of the disclosure.

The benefits, advantages, solutions to problems, and any element(s) that may cause any benefit, advantage, or solution to occur or become more pronounced are not to be construed as a critical, required, or essential features or elements of any or all the future claims.

While the glow-in-the-dark dock piling cap has been described and disclosed in certain terms and has disclosed certain embodiments or modifications, persons skilled in the art who have acquainted themselves with the disclosure, will appreciate that it is not necessarily limited by such terms, nor to the specific embodiments and modification disclosed herein. Thus, a wide variety of alternatives, suggested by the teachings herein, can be practiced without departing from the spirit of the disclosure, and rights to such alternatives are particularly reserved and considered within the scope of the disclosure.

From the foregoing, it will be appreciated that specific embodiments of the glow-in-the-dark dock piling cap have been described herein for purposes of illustration, but that various modifications may be made without deviating from the spirit and scope of the invention. Accordingly, the invention is not limited except as by the appended claims.

I claim:

1. A lighted cap for securing to a dock piling that alerts people to a location of the dock piling in low light conditions, comprising:
    an enclosure adapted for securement to the top of the dock piling, the enclosure including an angled top member and sidewall extending downward from the angled top member, wherein the enclosure is constructed of marine-grade materials that can last multiple years in an environment where the dock piling is installed;
    a coating applied to the enclosure, the coating containing a chemical that absorbs light during daylight conditions and radiates light during low light conditions without using electricity, wherein the coating is mixed into a resin used to make the enclosure and provides protection for the piling from the elements including at least ultraviolet (UV) rays from the sun; and
    one or more fasteners that secure the enclosure to the dock piling;

wherein during low light conditions when the coating is radiating light, the radiated light serves as a boating navigation marker for the dock piling where the dock piling may not be visible or easily seen, wherein the radiated light has a color selected to convey whether boats should stay to the right or left of the dock piling to be in safe water.

2. The lighted cap of claim 1 wherein the lighted cap contains no batteries.

3. The lighted cap of claim 1 wherein the lighted cap can be operated for at least one year without maintenance by a person.

4. The lighted cap of claim 1 wherein the enclosure is sized to fit over a cylindrical dock piling.

5. The lighted cap of claim 1 wherein the enclosure is sized to fit over a rectangular prism dock piling.

6. The lighted cap of claim 1 wherein the sidewall of the enclosure has one or more predrilled holes through which the one or more fasteners pass to secure the enclosure to the dock piling.

7. The lighted cap of claim 1 wherein the interior of the sidewall of the enclosure is threaded to screw onto the dock piling.

8. The lighted cap of claim 1 wherein the angled top member is angled to shed water from the lighted cap by gravity.

9. The lighted cap of claim 1 wherein the angled top member is shaped to discourage birds from sitting on the lighted cap.

10. The lighted cap of claim 1 wherein the coating emits a color of light selected to identify a location of the dock piling.

11. The lighted cap of claim 1 wherein the dock piling is made of wood, and the lighted cap covers the top end grain of the wooden dock piling to increase the useful lifetime of the dock piling.

12. The lighted cap of claim 1 wherein the sidewall contains a second coating that is reflective to reflect light aimed at the lighted cap.

13. The lighted cap of claim 1 wherein the one or more fasteners include a glue that is used to adhere the lighted cap to the dock piling.

14. A lighted cap for securing to a dock piling that alerts people to a location of the dock piling in low light conditions, comprising:
    an enclosure adapted for securement to the top of the dock piling, the enclosure including an angled top member and sidewall extending downward from the angled top member, wherein the enclosure is constructed of marine-grade materials that can last multiple years in an environment where the dock piling is installed;
    wherein the enclosure is molded from a substance that contains a chemical that absorbs light during daylight conditions and radiates light during low light conditions without using electricity, wherein the substance is mixed into a resin used to make the enclosure and provides protection. for he pilling from the elements including at least ultraviolet (UV) rays from the sun; and
    one or more fasteners that secure the enclosure to the dock piling;
    wherein during low light conditions when the enclosure is radiating light, the radiated light serves as a boating navigation marker for the dock piling where the dock piling may not be visible or easily seen, wherein the radiated light has a color selected to convey whether boats should stay to the right or left of the dock piling to be in safe water.

15. The lighted cap of claim 14 wherein the enclosure is made of a plastic and the substance is mixed with the plastic during manufacturing to give the plastic glow in the dark properties.

16. The lighted cap of claim 14 wherein the enclosure is molded from a second substance that protects the lighted cap from ultraviolet rays.

17. The lighted cap of claim 14 wherein the lighted cap can be operated for at least one year without maintenance by a person.

18. The lighted cap of claim 14 wherein the substance emits a color of light selected to identify a location of the dock piling.

19. The lighted cap of claim 14 wherein the angled top member is angled to shed water from the lighted cap by gravity.

20. A method for alerting boat traffic of a fixed structure in a waterway during low light conditions, the method comprising:
    securing a lighted cap to a top area of the fixed structure, the lighted cap comprising an enclosure, the enclosure being made from a substance that absorbs light during daylight conditions and radiates light during low light conditions without using electricity, wherein the enclosure is constructed of marine-grade materials that can last multiple years in an environment where a dock piling is installed, wherein the substance is mixed into a resin used to make the enclosure and provides protection for the piling from the elements including at least ultraviolet (UV) rays from the sun;
    absorbing light during daylight conditions;
    radiating light during low light conditions; and
    providing enough radiated light from the lighted cap during low light conditions such that an operator of a boat is able to see the light from a distance and be alerted to the presence of the fixed structure in the waterway in time to avoid running into the fixed structure, wherein the radiated light has a color selected to convey whether boats should stay to the right or left of the fixed structure to be in safe water.

* * * * *